(12) United States Patent
Koyamada

(10) Patent No.: US 7,873,273 B2
(45) Date of Patent: Jan. 18, 2011

(54) APPARATUS FOR MEASURING THE CHARACTERISTICS OF AN OPTICAL FIBER

(75) Inventor: Yahei Koyamada, 3-12-13 Minami-Koiwa, Edogawa-ku, Tokyo (JP)

(73) Assignees: Yokogawa Electric Corporation, Tokyo (JP); Yahei Koyamada, Tokyo (JP)

(*) Notice: Subject to any disclaimer, the term of this patent is extended or adjusted under 35 U.S.C. 154(b) by 611 days.

(21) Appl. No.: 12/000,249

(22) Filed: Dec. 11, 2007

(65) Prior Publication Data

US 2008/0145049 A1 Jun. 19, 2008

(30) Foreign Application Priority Data

Dec. 13, 2006 (JP) ............... 2006-336200

(51) Int. Cl.
*H04B 10/08* (2006.01)
(52) U.S. Cl. ............... 398/28; 398/25; 398/29; 398/20; 356/73.1; 385/15; 385/27; 250/559.04; 250/559.08; 250/227.14
(58) Field of Classification Search .......... 398/25, 398/28, 29, 13, 16, 17, 20, 21, 33, 177, 102, 398/141, 151, 152, 158, 159, 161, 163, 164, 398/79, 202, 203, 204, 205, 214; 356/73.1; 385/14, 15, 27, 28, 71, 24, 12; 250/559.04, 250/559.08, 227.14, 227.18
See application file for complete search history.

(56) References Cited

U.S. PATENT DOCUMENTS 6,700,655 B2 * 3/2004 Uchiyama et al. .......... 356/73.1

2001/0050768 A1 * 12/2001 Uchiyama et al. .......... 356/73.1
2006/0018586 A1  1/2006 Kishida

FOREIGN PATENT DOCUMENTS

| JP | 01-276039 A | 11/1989 |
|---|---|---|
| JP | 02-006725 A | 1/1990 |
| JP | 2000-180265 A | 6/2000 |
| JP | 2000-298077 A | 10/2000 |

OTHER PUBLICATIONS

Li Che-Hien et al., "PPP-BOTDA method to achieve cm-order spatial resolution in Brillouin distributed measuring technique", IEICE Technical Report, vol. 105, No. 242, OFT 2005-16, pp. 1-6 (2005).

* cited by examiner

*Primary Examiner*—Hanh Phan
(74) *Attorney, Agent, or Firm*—Sughrue Mion, PLLC

(57) ABSTRACT

An apparatus for measuring the characteristics of an optical fiber is provided. An optical pulse generator generates, from a coherent light, first and second optical pulses having a time interval which is equal to or shorter tan a life time of an acoustic wave in the optical fiber. A detector couples the coherent light with a Brillouin backscattered light which includes first and second Brillouin backscattered lights belonging to the first and second optical pulses respectively, thereby generating an optical signal. The detector further converts the optical signal into an electrical signal. A signal processor takes the sum of the electrical signal and a delay electrical signal which is delayed from the electrical signal by a delay time corresponding to the time interval, thereby generating an interference signal, and finds the characteristics of the optical fiber based on the interference signal.

5 Claims, 7 Drawing Sheets

APPARATUS FOR MEASURING THE CHARACTERISTICS OF AN OPTICAL FIBER

BACKGROUND OF THE INVENTION

1. Field of the Invention

The present invention generally relates to an apparatus for measuring the characteristics of an optical fiber. More specifically, the present invention relates to an apparatus for measuring the characteristics of an optical fiber, wherein the apparatus is configured to launch an optical pulse generated from a coherent light into an optical fiber, mixing the coherent light and a Brillouin backscattered light from the optical fiber to obtain a mixed light signal, converting the mixed light signal into an electric signal, and finding the characteristics of an optical fiber based on the electric signal.

Priority is claimed on Japanese Patent Application No. 2006-336200, filed Dec. 13, 2006, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

There has been established a first conventional method of measuring the strain distribution and the temperature distribution along an optical fiber in an environment in which the optical fiber is installed. The first conventional method measures the center frequency of a Brillouin scattered light that is generated from the optical fiber into which an optical pulse has been launched. This first conventional method uses the installed optical fiber as a medium for detecting the strain and the temperature thereof. This first conventional method simplifies the configuration that needs to measure the strain distribution and the temperature distribution as compared to when using a lot of point sensors.

Typical examples of the first conventional method may include Brillouin optical time domain reflectometry (BOTDR) and Brillouin optical time domain analysis (BOTDA).

The Brillouin optical time domain reflectometry (BOTDR) is a method to measure the Brillouin frequency shift of a spontaneous Brillouin backscattered light, which has been reflected by acoustic wave that varies in velocity depending upon the strain and the temperature. Namely, the Brillouin optical time domain reflectometry (BOTDR) is a method of detecting the Brillouin backscattered light that is emitted from an input end of an optical fiber after a pulse light has been launched into the same end of the optical fiber. The Brillouin optical time domain reflectometry (BOTDR) is disclosed in Japanese patents Nos. 2575794 and 3481494.

Brillouin optical time domain analysis (BOTDA) is a method of measuring a varying component of a probe light, wherein the variation of the probe light appears due to Brillouin stimulated-scattering phenomenon that is caused by a pumping light or pulse light having a higher intensity than a threshold when the pumping light or pulse light is launched into one end of an optical fiber, while the probe light is launched into the other end of the optical fiber. This Brillouin optical time domain analysis (BOTDA) is disclosed in Japanese patent No. 2589345.

It has been known for the Brillouin optical time domain reflectometry (BOTDR) and the Brillouin optical time domain analysis (BOTDA) that narrowing the pulse width that is launched to the optical fiber improves the spatial resolution. Extensively narrowing the pulse width beyond the narrower limit makes it difficult to accurately measure the center frequency of the Brillouin scattered light. The spatial resolution is ranged about 2 m or 3 m.

A distributed optical fiber sensing system utilizing transient phenomenon of an acoustic wave has been proposed in order to improve the spatial resolution of the measurement method that uses the stimulated Brillouin scattered light. This system is disclosed in Report, Vol. 105, No. 242, OFT2005-16, P.1-6 (2005). This distributed optical fiber sensing system is realized by taking into account the transient phenomenon that inhibit instantaneous start up oscillation since the acoustic wave causing the Brillouin scattering is the mechanical oscillation. After a first pump light is propagated through an optical fiber, then a second pump light that causes Brillouin scattered light for measurement is propagated through the optical fiber, thereby preventing the transient phenomenon from appearing on the Brillouin scattered light for measurement, and realizing a high spatial resolution of about 10 cm.

Another device has been proposed for realizing a high spatial resolution of centimeter-order, which is so called Brillouin optical correlation domain analysis (BOCDA) that is different from a time domain measurement. This proposal is disclosed in Japanese patent No. 3667132. This device uses a frequency converter to change the center frequency of a probe light so that the difference in center frequency between a pump light and the probe light approaches among the Brillouin frequency shift. Then, the device performs frequency modulation to a light source, thereby causing a power transfer from the pump light to the probe light at a position where the pump light and the probe light are synchronized in phase. The device uses a photo detector that detects the optical power of the probe light that has been emitted from the optical fiber, thereby measuring Brillouin spectrum at the position where the pump light and the probe light are synchronized in phase. This device realizes a high spatial resolution of about 1 cm. This method is so called Brillouin optical correlation domain analysis (BOCDA).

OFT2005-16, P.1-6 and Japanese patent No. 3667132 need that measuring lights are launched into both ends of an optical fiber. These documents fail to propose improvement of the spatial resolution of the Brillouin optical time domain reflectometry (BOTDR).

The Brillouin optical time domain analysis (BOTDA) and the Brillouin optical correlation domain analysis (BOCDA) need that the pump light and the probe light are launched into both ends of an optical fiber. The device realizing the Brillouin optical time domain analysis (BOTDA) or the Brillouin optical correlation domain analysis (BOCDA) is likely to be complicated in structure and highly expensive.

It would have been non-common sense and non-obviousness to try to a person having ordinary skilled in the art to realize an apparatus and a method of realizing a high spatial resolution of the Brillouin optical time domain reflectometry (BOTDR).

In view of the above, it will be apparent to those skilled in the art from this disclosure that there exists a need for an improved device and method of realizing a high spatial resolution of the Brillouin optical time domain reflectometry (BOTDR). This invention addresses this need in the art as well as other needs, which will become apparent to those skilled in the art from this disclosure.

SUMMARY OF THE INVENTION

Accordingly, it is a primary object of the present invention to provide an apparatus for measuring the characteristics of an optical fiber.

It is another object of the present invention to provide an apparatus for measuring the characteristics of an optical fiber by utilizing Brillouin scattering phenomenon, where a signal light is launched into only one end of the optical fiber, thereby realizing a high spatial resolution.

It is a further object of the present invention to provide a method of measuring the characteristics of an optical fiber.

It is a still further object of the present invention to provide a method of measuring the characteristics of an optical fiber by utilizing Brillouin scattering phenomenon, where a signal light is launched into only one end of the optical fiber, thereby realizing a high spatial resolution.

In accordance with one aspect of the present invention, an apparatus for measuring the characteristics of an optical fiber may include, but is not limited to, an optical pulse generator, a detector, a signal processor, and a frequency-varying device. The optical pulse generator generates a series of first and second optical pulses from a coherent light. The first and second optical pulses have a time interval between them. The time interval is equal to or shorter than a life time of an acoustic wave in the optical fiber. The optical pulse generator emits the series of first and second optical pulses toward the optical fiber. The detector couples the coherent light with a Brillouin backscattered light which includes first and second Brillouin backscattered lights belonging to the first and second optical pulses respectively, thereby generating an optical signal. The detector further converts the optical signal into an electrical signal. The signal processor takes the sum of the electrical signal and a delay electrical signal which is delayed from the electrical signal by a delay time corresponding to the time interval, thereby generating an interference signal, the signal processor finding the characteristics of the optical fiber based on the interference signal. The frequency-varying device allows the signal processor to obtain a Brillouin spectrum from the electrical signal.

A series of first and second optical pulses is generated from a coherent light, wherein the first and second optical pulses have a time interval between them, which is equal to or shorter than a life time of an acoustic wave in the optical fiber. The coherent light is coupled with a Brillouin backscattered light which includes first and second Brillouin backscattered lights belonging to the first and second optical pulses respectively, thereby generating an optical signal. The optical signal is converted into an electrical signal. There is taken the sum of the electrical signal and a delay electrical signal which is delayed from the electrical signal by a delay time corresponding to the time interval, thereby generating an interference signal. The characteristics of the optical fiber are found based on the interference signal.

The polarization state varying device may vary at least one of a polarization state of the coherent light and a polarization state of the Brillouin backscattered light.

The apparatus for measuring the characteristics of an optical fiber may further include a remover that removes unnecessary component from the series of the first and second optical pulses that are to be transmitted to the optical fiber.

The apparatus for measuring the characteristics of an optical fiber may further include a signal generator that generates a mixing signal having a frequency that generally corresponds to Brillouin frequency shift of the Brillouin backscattered light.

The life time may be a time period from appearance of the power peak of the acoustic wave until the power of the acoustic wave decays to not more than 5% of the peak power.

In accordance with the present invention, a series of first and second optical pulses is generated from a coherent light, wherein the first and second optical pulses have a time interval between them, which is equal to or shorter than a life time of an acoustic wave in the optical fiber. The coherent light is coupled with a Brillouin backscattered light which includes first and second Brillouin backscattered lights belonging to the first and second optical pulses respectively, thereby generating an optical signal. The optical signal is converted into an electrical signal. There is taken the sum of the electrical signal and a delay electrical signal which is delayed from the electrical signal by a delay time corresponding to the time interval, thereby generating an interference signal. The characteristics of the optical fiber are found based on the interference signal. A Brillouin spectrum included the interference signal is steeper than first and second Brillouin spectrums of the first and second Brillouin backscattered lights belonging to the first and second optical pulses respectively. Measuring the characteristics of the optical fiber based on the interference signal makes it easy to detect the Brillouin frequency shift, thereby improving the spatial resolution.

The present invention realizes a high spatial resolution in the measurement of the characteristics of an optical fiber by having an optical signal launched into one end of the optical fiber.

These and other objects, features, aspects, and advantages of the present invention will become apparent to those skilled in the art from the following detailed descriptions taken in conjunction with the accompanying drawings, illustrating the embodiments of the present invention.

BRIEF DESCRIPTION OF THE DRAWINGS

Referring now to the attached drawings which form a part of this original disclosure.

DETAILED DESCRIPTION OF THE INVENTION

Selected embodiments of the present invention will now be described with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
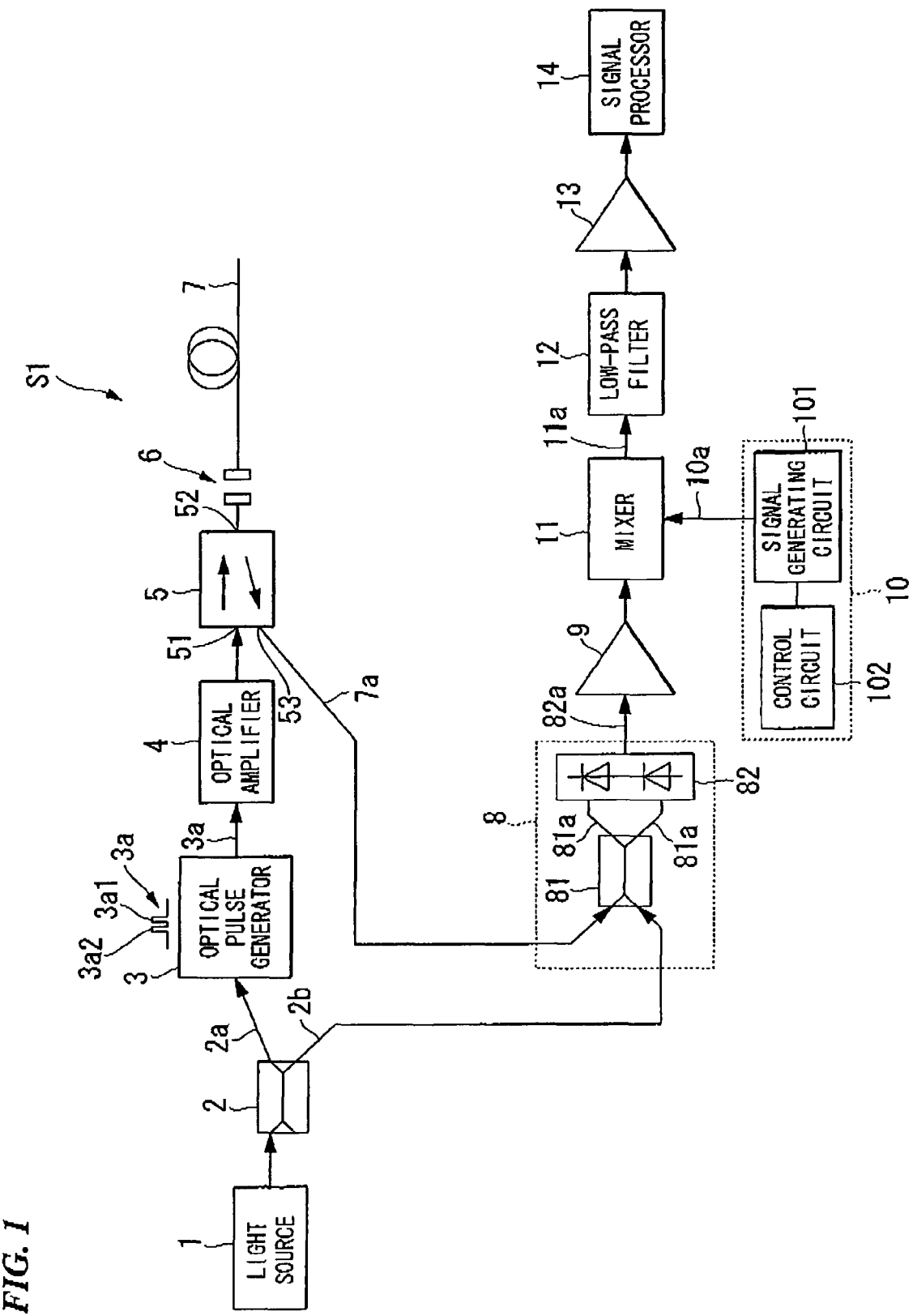
FIG. 1 is a block diagram illustrating a configuration of an apparatus for measuring the characteristics of an optical fiber in accordance with a first embodiment of the present invention.

FIG. 1 is a block diagram illustrating a configuration of an apparatus S1 for measuring the characteristics of an optical fiber in accordance with this first embodiment of the present invention. The apparatus S1 for measuring the characteristics of an optical fiber may include a light source 1, a branch coupler 2, an optical pulse generator 3, an optical amplifier 4, an optical directional coupler 5, an optical connector 6, an optical fiber 7, a balanced light receiving circuit 8, a first amplifier 9, a signal generator 10, a mixer 11, a low-pass filter 12, a second amplifier 13, and a signal processing unit 14. The optical fiber 7 is subjected to measurement by the apparatus S1.

The light source 1 is configured to emit a coherent light 1a having a narrow line-width and a frequency $f_0$. The light source 1 can be realized by a 1.55 µm-band multiple quantum well distributed feedback (MQW-DFB) semiconductor laser.

The branch coupler 2 can be configured to divide the coherent light 1a into first and second divided coherent lights 2a and 2b. The branch coupler 2 can be realized by a 1×2 branch coupler that has a single input port and two output ports. The single input port receives the coherent light 1a. The 1×2 branch coupler divides the coherent light 1a into first and second divided coherent lights 2a and 2b and emits the first and second divided coherent lights 2a and 2b from the two output ports.

The optical pulse generator 3 can be realized by a high speed switch. The optical pulse generator 3 can be configured to receive the first divided coherent light 2a from the branch coupler 2. The optical pulse generator 3 can be configured to generate a series of optical pulses 3a, for example, a series of first and second optical pulses 3a1 and 3a2. Each of the first and second optical pulses 3a1 and 3a2 has a pulse width that is so narrow as to allow the apparatus S1 to realize a required spatial resolution. Typically, the pulse width of each optical pulse 3a may be in the order of a few nanoseconds. The optical pulse generator 3 can be configured to emit a series of optical pulses 3a, for example, a series of first and second optical pulses 3a1 and 3a2 toward the optical amplifier 4.

The second optical pulse 3a2 follows the first optical pulse 3a1 at a time interval that is equal to or shorter than a life time of an acoustic wave in the optical fiber 7. The time interval between the first and second optical pulses 3a1 and 3a2 may preferably be at most 5 nanoseconds. The life time of an acoustic wave may in general mean the life time of an acoustic wave that is generated in the optical fiber 7. The life time of an acoustic wave may be a time period from generation of an acoustic wave to extinction thereof. In order to ensure generation of an interference signal, the life time of an acoustic wave can preferably be defined to be a time period from appearance of the power peak of the acoustic wave until the power of the acoustic wave is decayed to not more than 5% of the peak power. In some cases, the energy of the acoustic wave is decayed based on the following equation.

$$\exp[-t/Ta] \tag{1}$$

where Ta represents the damping factor time of an acoustic wave.

The time period "t" from appearance of the power peak of the acoustic wave until the power of the acoustic wave is decayed to not more than 5% of the peak power is given by t>3Ta.

The cycle of generating a series of optical pulses 3a may depend on the length of the optical fiber 7, namely, a distance range. When the distance range is 10 km, the generation cycle may be about 200 microseconds. When the distance range is 1 km, the generation cycle may be about 20 microseconds.

The optical amplifier 4 can be realized by an optical fiber amplifier, such as an erbium-doped fiber. The optical amplifier 4 can be configured to receive the series of optical pulses 3a from the optical pulse generator 3. The optical amplifier 4 can be configured to amplify the series of optical pulses 3a and generate a series of amplified optical pulses. The optical amplifier 4 can be configured to emit a series of amplified optical pulses 3a toward the optical directional coupler 5.

The optical directional coupler 5 can be realized by an optical circulator. The optical directional coupler 5 may have an input port 51, an input/output port 52 and an output port 53. The input port 51 receives the series of amplified optical pulses 3a from the optical amplifier 4. The optical directional coupler 5 emits the series of amplified optical pulses 3a from the input/output port 52. The input/output port 52 also receives a reflected light 7a through the optical connector 6 from the optical fiber 7. The optical directional coupler 5 emits the reflected light 7a from the output port 53.

The optical connector 6 connects the input/output port 52 to one end of the optical fiber 7. The optical connector 6 is configured to allow that the series of amplified optical pulses 3a is transmitted from the optical directional coupler 5 to the optical fiber 7. The optical connector 6 is configured to allow that the reflected light 7a is transmitted from the optical fiber 7 to the optical directional coupler 5.

The reflected light 7a from the optical fiber 7 includes optical signals that further includes spontaneous Brillouin backscattered light, as well as Rayleigh backscattering light and Fresnel reflected light. The reflected light 7a from the optical fiber 7 has a frequency $f_b$. The spontaneous Brillouin backscattered light has a frequency shift $f_s$ from the frequency of a series of optical pulses 3a, namely the frequency $f_0$ of the coherent light 1a. In other words, the spontaneous Brillouin scattered light has a frequency that is shifted by the frequency shift $f_s$ from the frequency $f_0$ of the coherent light 1a. The frequency $f_b$ of the reflected light 7a includes a shifted frequency given by $f_0 \pm f_s$. The reflected light 7a from the optical fiber 7 includes not only the spontaneous Brillouin backscattered light but also Rayleigh backscattered light and Fresnel reflected light. Each of the Rayleigh backscattered light and Fresnel reflected light has no frequency shift, $f_s = 0$. Each of the Rayleigh scattering light and Fresnel reflected light has a frequency that is equal to the frequency $f_0$ of the coherent light $1a$. The frequency $f_b$ of the reflected light $7a$ includes not only shifted frequency given by $f_0 \pm f_s$, but also the frequency $f_0$.

As described above, a series of the optical pulses $3a$ that is launched into the optical fiber 7 has a series of first and second optical pulses $3a1$ and $3a2$ that have a time interval that is not more than the life time of an acoustic wave. The reflected light $7a$ from the optical fiber 7 includes a first reflected light of the first optical pulse $3a1$ and a second reflected light of the second optical pulse $3a2$.

The balanced light receiving circuit 8 can be configured to receive the second divided coherent light $2b$ from the branch coupler 2 and the reflected light $7a$ from the optical directional coupler 5. The balanced light receiving circuit 8 can be configured to optically couple or combine the second divided coherent light $2b$ and the reflected light $7a$, thereby generating a combined optical signal. The balanced light receiving circuit 8 can further be configured to convert the combined optical signal into an electrical signal. The balanced light receiving circuit 8 may include a branch coupler 81 and a photodetector 82.

The branch coupler 81 is configured to receive the second divided coherent light $2b$ having the frequency $f_0$ from the branch coupler 2 and the reflected light $7a$ having the frequency $f_b$ from the optical directional coupler 5. As described above, the frequency $f_b$ includes not only the shifted frequency given by $f_0 \pm f_s$ but also the frequency $f_0$. The branch coupler 81 is configured to optically couple or combine the second divided coherent light $2b$ and the reflected light $7a$, thereby generating an optical signal $81a$. The optical signal $81a$ has three frequency components of $f_0$, and $f_0 \pm f_s$.

The photodetector 82 is configured to receive the optical signal $81a$ from the branch coupler 81. The photodetector 82 is configured to convert the optical signal $81a$ into an electrical signal $82a$.

Namely, the balanced light receiving circuit 8 can be configured to generate the electrical signal $82a$ from the second divided coherent light $2b$ and the reflected light $7a$. As described above, the reflected light $7a$ from the optical fiber 7 includes the reflected light of the first optical pulse $3a1$ and the reflected light of the second optical pulse $3a2$. The optical signal $81a$ generated by the branch coupler 81 also includes a first optical component that belongs to the reflected light of the first optical pulse $3a1$ and a second optical component that belongs to the reflected light of the second optical pulse $3a2$. The electrical signal $82a$ generated by the photodetector 82 includes a first electrical component that belongs to the reflected light of the first optical pulse $3a1$ and a second electrical component that belongs to the reflected light of the second optical pulse $3a2$. The time interval between the first optical pulse $3a1$ and the second optical pulse $3a2$ is equal to or shorter than the life time of an acoustic wave in the optical fiber 7. The electrical signal $82a$ generated by the photodetector 82 has a time interval between the first and second electrical components that respectively belong to the reflected lights of the first and second optical pulses $3a1$ and $3a2$. The time interval of the electrical signal $82a$ is equal to the time interval between the first and second optical pulses $3a1$ and $3a2$.

The first amplifier 9 can be configured to receive the electrical signal $82a$ from the balanced light receiving circuit 8. The first amplifier 9 can be configured to amplify the electrical signal $82a$ up to a proper level that allows the mixer 11 to process.

The electrical signal $82a$ includes a direct current component that is removed by the alternate-current coupling.

The signal generator 10 may includes a signal generator 101 and a control circuit 102. The signal generator 101 is configured to generate a radio frequency signal $10a$ of sine wave to be mixed with the amplified electrical signal $82a$ by the mixer 11. The radio frequency signal $10a$ has a frequency $f_r$. The control circuit 102 is connected to the signal generator 101. The control circuit 102 controls or sets the frequency $f_r$ of the radio frequency signal $10a$. In this embodiment, the frequency $f_r$ of the radio frequency signal $10a$ is varied in the range of about 8 GHz to about 12 GHz in the vicinity of the frequency shift $f_s$ of the reflected light in order to detect the Brillouin scattered light. The signal generator 10 varies the frequency $f_r$ of the radio frequency signal $10a$ so as to measure the spectrum of the amplified electrical signal $82a$. Namely, the signal generator 10 is configured to vary the frequency $f_r$ of the radio frequency signal $10a$. The signal generator 10 performs as a frequency-varying device that vary the frequency $f_r$ of the radio frequency signal $10a$. In other words, the signal generator 10 performs as a frequency-varying device that allows obtaining a Brillouin spectrum from the electrical signal.

The mixer 11 can be configured to receive the amplified electrical signal $82a$ from the first amplifier 9 and the radio frequency signal $10a$ from the signal generator 10. The mixer 11 can be configured to mix the amplified electrical signal $82a$ and the radio frequency signal $10a$, thereby generating an electric signal $11a$. The electric signal $11a$ is generated from the amplified electrical signal $82a$ by downshifting the frequency of the amplified electrical signal $82a$ by the Brillouin frequency shift $f_s$ of the reflected light. In other words, the electric signal $11a$ is a base band signal. The frequency $f_r$ of the radio frequency signal $10a$ is set in the vicinity of the Brillouin frequency shift $f_s$ of the reflected light. The frequency component that is downshifted by the frequency $f_r$ of the radio frequency signal $10a$ among the Brillouin frequency shift $f_s$ of the reflected light comes near the direct current component (base band). The frequency component comes into the frequency band that allows the low-pass filter 12, the second amplifier 13 and the signal processing unit 14 to process easily.

The balanced light receiving circuit 8 outputs the electrical signal $82a$ that includes the first and second electrical components that respectively belong to the reflected lights of the first and second optical pulses $3a1$ and $3a2$, wherein the time interval between the first and second electrical components is equal to the time interval between the first and second optical pulses $3a1$ and $3a2$. Thus, the electric signal $11a$ generated by the mixer 11 also includes third and fourth electric components that respectively belong to the reflected lights of the first and second optical pulses $3a1$ and $3a2$, wherein the time interval between the third and fourth electrical components is equal to the time interval between the first and second optical pulses $3a1$ and $3a2$.

In this embodiment, the mixer 11 and the signal generator 10 are used to obtain the electric signal $11a$. It is also possible as a modification that the coherent light to be coupled is frequency-converted to generate a frequency-converted coherent light that has a frequency substantially identical to the frequency of the Brillouin scattered light. The frequency-converted coherent light is then coupled or combined with the reflected light $7a$, thereby generating the optical signal $81a$ and obtaining the same effects as described above. It is also possible as a further modification that a light frequency converter is used to shift the frequency of the optical pulses $3a$ by an amount substantially identical to the frequency shift of the backscattered light, thereby obtaining the same effects as described above.

The low-pass filter 12 can be configured to receive the electric signal 11a from the mixer 11. The low-pass filter 12 can be configured to remove high frequency components such as noise from the electric signal 11a, thereby improving the signal-to-noise ratio of the electric signal 11a.

The second amplifier 13 can be configured to receive the filtered electric signal 11a from the low-pass filter 12. The second amplifier 13 can be configured to amplify the filtered electric signal 11a up to a higher level that allows the signal processing unit 14 to process the signal.

The signal processing unit 14 can be configured to receive the amplified electric signal 11a from the second amplifier 13. The signal processing unit 14 can be configured to takes the sum of the amplified electric signal 11a and an electric signal that has been generated by delaying the amplified electric signal 11a by the time interval between the first and second optical pulses 3a1 and 3a2, so that the signal processing unit 14 generates an interference signal. The signal processing unit 14 can be configured to take the sum of first and second electric components which respectively belong to the Brillouin backscattered lights of the first and second optical pulses 3a1 and 3a2, while adjusting respective time axes of the first and second electric components with each other. The first and second electric components are included in the electric signal 11a. Namely, the sum of first and second electric components is taken while adjusting respective time axes of the first and second electric components. The first and second electric components will be referred to as first and second optical pulse related components. The signal processing unit 14 can be configured to take the sum of the first and second optical pulse related components, thereby generating an interference signal so that the characteristics of the optical fiber 7 are measured based on the interference signal.

Figure 2:
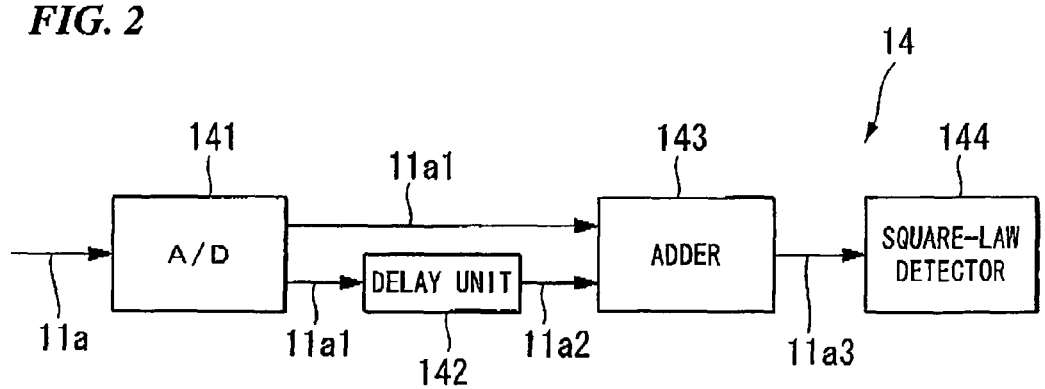
FIG. 2 is a block diagram illustrating an example of the configuration of a signal processing unit included in the apparatus of FIG. 1.

FIG. 2 is a block diagram illustrating an example of the configuration of the signal processing unit 14. The signal processing unit 14 may include an A/D converter 141, a delay unit 142, an adder 143, and a squire-law detector 144. The A/D converter 141 can be configured to receive the electric signal 11a as analog signal from the second amplifier 13. The electric signal 11a includes the first and second optical pulse related components. The A/D converter 141 can be configured to convert the electric signal 11a into a digital signal 11a1. The A/D converter 141 can be configured to supply the digital signal 11a1 in parallel to the delay unit 142 and the adder 143.

The delay unit 142 can be configured to receive the digital signal 11a1 from the A/D converter 141. The delay unit 142 can be configured to delay the digital signal 11a1 by a delay time that corresponds to the time interval between the first and second optical pulses 3a1 and 3a2, thereby generating a delay digital signal 11a2. The delay unit 142 can be configured to supply the delay digital signal 11a2 to the adder 143.

The adder 143 can be configured to receive the digital signal 11a1 from the A/D converter 141 and the delay digital signal 11a2 from the delay unit 142. The adder 143 can be configured to add the digital signal 11a1 and the delay digital signal 11a2, thereby generating an interference signal 11a3. The adder 143 can be configured to supply the interference signal 11a3 to the squire-law detector 144.

The squire-law detector 144 can be configured to receive the Brillouin backscattered signal that includes the interference signal 11a3 from the adder 143. The squire-law detector 144 can be configured to perform squire-law detection operation of the Brillouin backscattered signal that includes the interference signal 11a3.

It is possible as a modification that the function of the delay unit 142 is realized by software.

Figure 3:
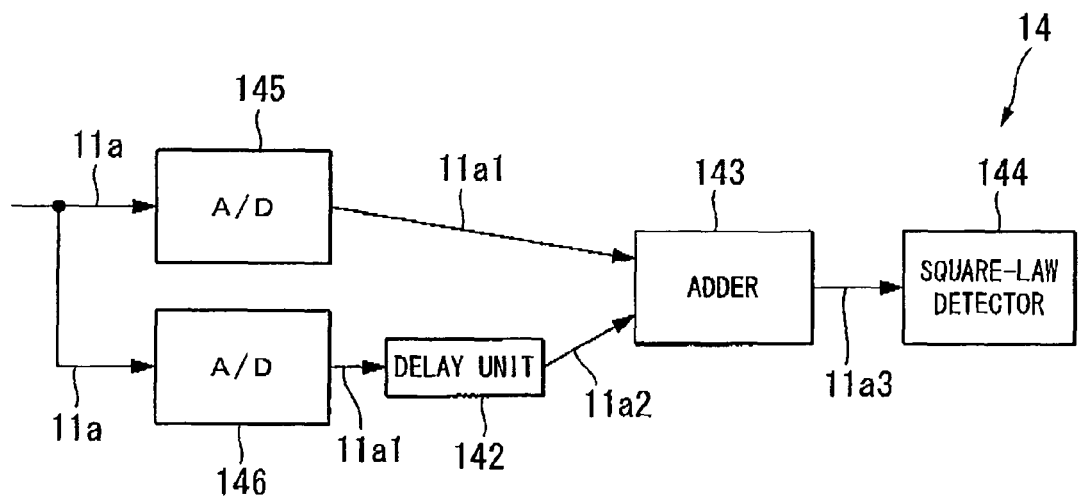
FIG. 3 is a block diagram illustrating another example of the configuration of a signal processing unit included in the apparatus of FIG. 1.

FIG. 3 is a block diagram illustrating another example of the configuration of the signal processing unit 14. The signal processing unit 14 may include a first A/D converter 145, a second AD converter 146, a delay unit 142, an adder 143, and a squire-law detector 144. The electric signal 11a as analog signal from the second amplifier 13 is divided into first and second divided electric signals 11a. The first A/D converter 145 can be configured to receive the first divided electric signal 11a as analog signal. The divided electric signal 11a includes the first and second optical pulse related components. The first A/D converter 145 can be configured to convert the first divided electric signal 11a into a first digital signal 11a1. The first A/D converter 141 can be configured to supply the first digital signal 11a1 to the adder 143.

The second A/D converter 146 can be configured to receive the second divided electric signal 11a as analog signal. The second divided electric signal 11a also includes the first and second optical pulse related components. The second A/D converter 146 can be configured to convert the second divided electric signal 11a into a second digital signal 11a1. The second A/D converter 141 can be configured to supply the second digital signal 11a1 to the delay unit 142.

The delay unit 142 can be configured to receive the second digital signal 11a1 from the second A/D converter 146. The delay unit 142 can be configured to delay the digital signal 11a1 by a delay time that corresponds to the time interval between the first and second optical pulses 3a1 and 3a2, thereby generating a delay digital signal 11a2. The delay unit 142 can be configured to supply the delay digital signal 11a2 to the adder 143.

The adder 143 can be configured to receive the first divided digital signal 11a1 from the first A/D converter 145 and the delay digital signal 11a2 from the delay unit 142. The adder 143 can be configured to add the first divided digital signal 11a1 and the delay digital signal 11a2, thereby generating an interference signal 11a3. The adder 143 can be configured to supply the interference signal 11a3 to the squire-law detector 144.

The squire-law detector 144 can be configured to receive the interference signal 11a3 from the adder 143. The squire-law detector 144 can be configured to perform squire-law detection operation of the interference signal 11a3. It is possible as a modification that the function of the delay unit 142 is realized by software.

Figure 4:
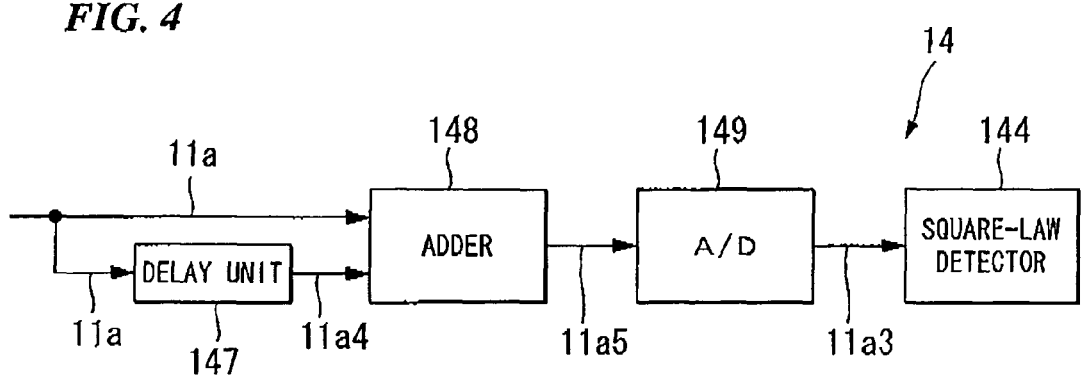
FIG. 4 is a block diagram illustrating still another example of the configuration of a signal processing unit included in the apparatus of FIG. 1.

FIG. 4 is a block diagram illustrating still another example of the configuration of the signal processing unit 14. The signal processing unit 14 may include a delay unit 147, an adder 148, an A/D converter 149, and a squire-law detector 144. The electric signal 11a as analog signal from the second amplifier 13 is divided into first and second divided electric signals 11a. The first divided electric signal 11a is supplied to the adder 148. The second divided electric signal 11a is supplied to the delay unit 147.

The delay unit 147 can be configured to receive the second divided electric signal 11a as analog signal. The delay unit 147 can be configured to delay the second divided electric signal 11a by a delay time that corresponds to the time interval between the first and second optical pulses 3a1 and 3a2, thereby generating a delay analog signal 11a4. The delay unit 147 can be configured to supply the delay analog signal 11a4 to the A/D converter 149.

The adder 148 can be configured to receive the first divided electric signal 11a and the delay analog signal 11a4 from the delay unit 147. The adder 148 can be configured to add the first divided electric signal 11a and the delay analog signal 11a4, thereby generating an interference signal 11a5 as analog signal. The adder 148 can be configured to supply the interference signal 11$a$5 to the A/D converter 149.

The A/D converter 149 can be configured to receive the interference signal 11$a$5 as analog signal from the adder 148. The A/D converter 149 can be configured to convert the interference signal 11$a$5 as analog signal into a digital interference signal 11$a$3. The A/D converter 149 can be configured to supply the digital interference signal 11$a$3 to the squire-law detector 144.

The squire-law detector 144 can be configured to receive the interference signal 11$a$3 from the A/D converter 149. The squire-law detector 144 can be configured to perform squire-law detection operation of the interference signal 11$a$3.

It is possible as a modification that the function of the delay unit 147 is realized by software. In this example, the squire-law detection operation of the interference signal 11$a$3 is performed by software, wherein the interference signal 11$a$3 must be digital signal. Thus, the A/D converter is necessary. If the squire-law detection operation of an analog interference signal is performed by hardware, no A/D converter is necessary.

The frequency $f_r$ of the radio frequency signal 10$a$ is varied in the vicinity of the Brillouin frequency shift $f_s$ of the reflected light so as to detect the Brillouin scattered light. The above-described processes will be repeated until the Brillouin spectrum is obtained.

After Brillouin spectrum is obtained, the signal processing unit 14 obtains the distributions of strain and temperature along the optical fiber.

The Brillouin scattered light has the following properties. Interference appears between Brillouin scattered lights that have been generated through reflecting optical pulses from the same acoustic wave in the optical fiber 7. No interference appears between Brillouin scattered lights that have been generated through reflecting optical pulses from different acoustic waves in the optical fiber 7. Acoustic wave has a certain velocity of propagation which is extremely slower than the velocity of optical pulse. It can be considered approximately that Brillouin scattered lights that have been generated through reflecting optical pulses from the same acoustic wave in the optical fiber 7 are generated at the same location. Interference appears between Brillouin scattered lights that have been generated at the same position in the optical fiber 7. No interference appears between Brillouin scattered lights that have been generated at different positions in the optical fiber 7.

As described above, the time interval between the first and second optical pulses 3$a$1 and 3$a$2 is equal to or shorter than the life time of the acoustic wave in the optical fiber 7. The first optical pulse 3$a$1 is reflected by an acoustic wave in the optical fiber 7, thereby generating a Brillouin backscattered light, while the second optical pulse 3$a$2 is also reflected by the same acoustic wave. As a result, the reflected light 7$a$ includes Brillouin backscattered lights interferable with each other. The signal processing unit 14 takes the sum of the Brillouin backscattered lights, while adjusting respective time axes thereof, thereby generating an interference signal.

The longest time interval between the first and second optical pulses 3$a$1 and 3$a$2 that can generate interferable Brillouin backscattered lights is substantially equal to the life time of an acoustic wave in the optical fiber 7. In a case, it is possible that the first optical pulse 3$a$1 is reflected by an acoustic wave that is about to be disappeared, before the acoustic wave has just been disappeared prior to the arrival of the second optical pulse 3$a$2. In this case, there is no Brillouin backscattered light that is to be interfered with the Brillouin backscattered light that has been generated from the first optical pulse 3$a$1. Thus, the signal processing unit 14 generates no interference signal. However, as long as the time interval between the first and second optical pulses 3$a$1 and 3$a$2 is equal to or shorter than the life time of an acoustic wave, it is impossible that any Brillouin backscattered lights have no interference counterpart with which they will interfere. Thus, the time interval that is equal to or shorter than the life time of an acoustic wave allows the signal processing unit 14 to generate an interference signal and to measure the characteristics of the optical fiber 7 based on the interference signal. Namely, the measurement of the characteristics can be made over the entire length of the optical fiber 7.

Operations of the apparatus S1 for measuring the characteristics of an optical fiber will be described, assumed that the first and second optical pulses 3$a$1 and 3$a$2 reach the same acoustic wave in the optical fiber 7 to be measured.

A coherent light 1$a$ having a narrow line-width and a frequency $f_0$ is emitted from the light source 1. The coherent light 1$a$ is launched into the branch coupler 2. The coherent light 1$a$ is split or divided by the branch coupler 2 into the first and second divided coherent lights 2$a$ and 2$b$. The first divided coherent light 2$a$ is transmitted to the optical pulse generator 3. The second divided coherent light 2$b$ is transmitted to the balanced light receiving circuit 8.

The first divided coherent light 2$a$ is launched into the optical pulse generator 3. A series of optical pulses 3$a$, for example, a series of first and second optical pulses 3$a$1 and 3$a$2 is generated by the optical pulse generator 3. The time interval between the first and second optical pulses 3$a$1 and 3$a$2 is equal to or shorter than a life time of an acoustic wave in the optical fiber 7. The life time of an acoustic wave may be a time period from generation of an acoustic wave to extinction thereof. In order to ensure generation of an interference signal, the life time of an acoustic wave can preferably be a time period from appearance of the power peak of the acoustic wave until the power of the acoustic wave is decayed to not more than 5% of the peak power.

The series of optical pulses 3$a$ is then transmitted to the optical amplifier 4. The series of optical pulses 3$a$ is amplified by the optical amplifier 4, thereby generating a series of amplified optical pulses. The series of amplified optical pulses is transmitted to the optical directional coupler 5. For example, the series of amplified optical pulses 3$a$ is incident into the input port 51 of the optical directional coupler 5. The series of amplified optical pulses 3$a$ is then emitted from the input/output port 52 of the optical directional coupler 5. The series of amplified optical pulses 3$a$ is then transmitted through the optical connector 6 to the optical fiber 7. The series of amplified optical pulses 3$a$ is launched into the one end of the optical fiber 7.

The series of optical pulses 3$a$ is propagated through the optical fiber 7. The series of optical pulses 3$a$ is the series of the first and second optical pulses 3$a$1 and 3$a$2. As described above the time interval between the first and second optical pulses 3$a$1 and 3$a$2 is so short that the first and second optical pulses 3$a$1 and 3$a$2 reaches the same acoustic wave in the optical fiber 7, thereby generating Brillouin scattered light. Thus, the reflected light 7$a$ from the optical fiber 7 includes first and second Brillouin backscattered light components of the first and second optical pulses 3$a$1 and 3$a$2. The first and second Brillouin backscattered light components are partially overlapped with each other and have a delay in time which corresponds to the time interval between the first and second optical pulses 3$a$1 and 3$a$2.

As described above, the reflected light 7$a$ from the optical fiber 7 has component of Brillouin frequency shift $f_s$ that has been caused by the Brillouin scattering phenomenon. Thus, the reflected light 7a has a frequency $f_b$ that is given by $f_0 \pm f_s$. The reflected light 7a from the optical fiber 7 also includes Rayleigh backscattering light and Fresnel reflected light. Each of the Rayleigh backscattering light and Fresnel reflected light has a frequency that is equal to the frequency $f_0$ of the coherent light 1a. The frequency $f_b$ of the reflected light 7a includes not only shifted frequency given by $f_0 \pm f_s$, but also the frequency $f_0$.

The reflected light 7a is transmitted through the connector 6 to the optical directional coupler 5. The reflected light 7a is incident into the input/output port 52 of the optical directional coupler 5. The reflected light 7a is emitted from the output port 53 of the optical directional coupler 5. The reflected light 7a is then transmitted to the balanced light receiving circuit 8. The reflected light 7a is incident into the branch coupler 81 that is included in the balanced light receiving circuit 8. The second divided coherent light 2b is also transmitted from the branch coupler 2 to the balanced light receiving circuit 8. The second divided coherent light 2b is incident into the branch coupler 81 that is included in the balanced light receiving circuit 8. The reflected light 7a is coupled with the second divided coherent light 2b by the branch coupler 81, thereby generating an optical signal 81a. The optical signal 81a is then transmitted to the photodetector 82 that is included in the balanced light receiving circuit 8. The optical signal 81a is converted into an electrical signal 82a by the photodetector 82.

As described above, the frequency $f_b$ includes not only the Brillouin shifted frequency given by $f_0 \pm f_s$ but also the frequency $f_0$. The optical signal 81a has three frequency components of $f_0$, and $f_0 \pm f_s$. The optical signal 81a generated by the branch coupler 81 also includes a first optical component that belongs to the reflected light of the first optical pulse 3a1 and a second optical component that belongs to the reflected light of the second optical pulse 3a2. Thus, the electrical signal 82a generated by the photodetector 82 includes a first electrical component that belongs to the reflected light of the first optical pulse 3a1 and a second electrical component that belongs to the reflected light of the second optical pulse 3a2. The time interval between the first optical pulse 3a1 and the second optical pulse 3a2 is equal to or shorter than the life time of an acoustic wave propagating in the optical fiber 7. The electrical signal 82a generated by the photodetector 82 has a time interval between the first and second electrical components that respectively belong to the reflected lights of the first and second optical pulses 3a1 and 3a2. The time interval of the electrical signal 82a is equal to the time interval between the first and second optical pulses 3a1 and 3a2.

The electrical signal 82a generated by the photodetector 82 is then transmitted to the first amplifier 9. The electrical signal 82a is amplified by the first amplifier 9, while removing the direct current component $f_0$ from the frequency $f_b$, thereby generating the amplified electrical signal 82a. The amplified electrical signal 82a is transmitted to the mixer 11.

In the signal generator 10, the control circuit 102 controls the signal generator 101 to generate a radio frequency signal 10a has a frequency $f_r$ which is varied in the range of about 8 GHz to about 12 GHz in the vicinity of the Brillouin frequency shift $f_s$ of the reflected light in order to detect the Brillouin scattered light. The radio frequency signal 10a is then transmitted to the mixer 11. The amplified electrical signal 82a is mixed with the radio frequency signal 10a by the mixer 11, thereby generating an electric signal 11a. The electric signal 11a is generated from the amplified electrical signal 82a by downshifting the frequency of the amplified electrical signal 82a by the frequency $f_r$. The electric signal 11a can be obtained, which has the frequency component that is reduced down to the base band of the Brillouin scattered light. The electric signal 11a generated by the mixer 11 is then transmitted to the low-pass filter 12. High frequency components such as noise are removed from the electric signal 11a by the low-pass filter 12, thereby improving the signal-to-noise ratio of the electric signal 11a.

In the three frequency components that are included in the amplified electrical signal 82a, only the signal component of the frequency $(f_s - f_r)$ is detected, thereby allowing the signal processor 14 to process an electric signal that is related to the Brillouin backscattered light.

The filtered electric signal 11a is then transmitted to the second amplifier 13. The filtered electric signal 11a is amplified by the second amplifier 13.

The amplified electric signal 11a as analog signal is then transmitted to the signal processing unit 14. The amplified electric signal 11a includes first and second components, wherein the first component belongs to the first Brillouin backscattered light of the first optical pulse 3a1, while the second component belongs to the second Brillouin backscattered light of the second optical pulse 3a2. There is a difference in phase between first and second Brillouin backscattered light that belongs respectively to the first and second optical pulse related components, wherein the difference in phase corresponds to the time interval between the first and second optical pulses 3a1 and 3a2.

Figure 5:
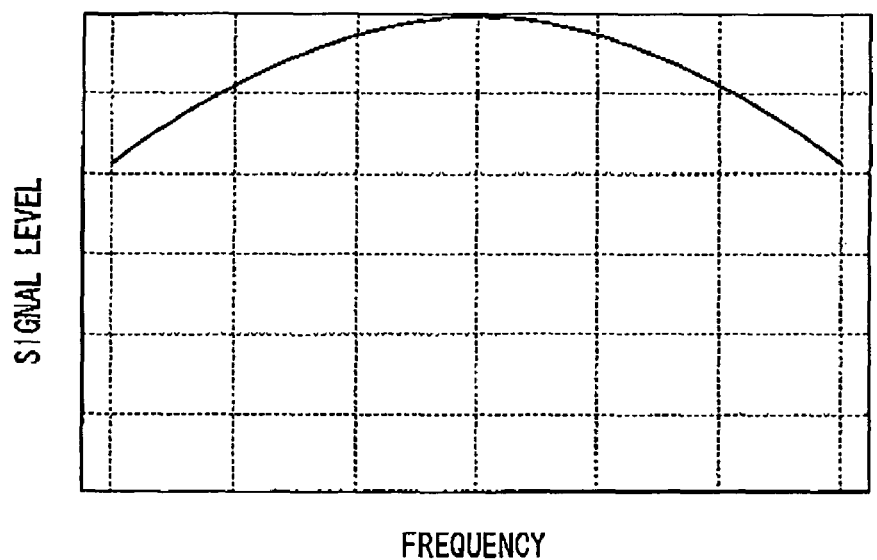
FIG. 5 is a diagram illustrating variation of signal level over frequency to illustrate Brillouin spectrum of a first optical pulse component.

FIG. 5 is a diagram illustrating variation of signal level over frequency to illustrate Brillouin spectrum of the first optical pulse related component.

The first Brillouin spectrum that belongs to the first optical pulse related component is so broad as shown in FIG. 5 and as one obtained when a single optical pulse is launched into the optical fiber 7. The second Brillouin spectrum that belongs to the second optical pulse related component is so broad as the first Brillouin spectrum.

Figure 6:
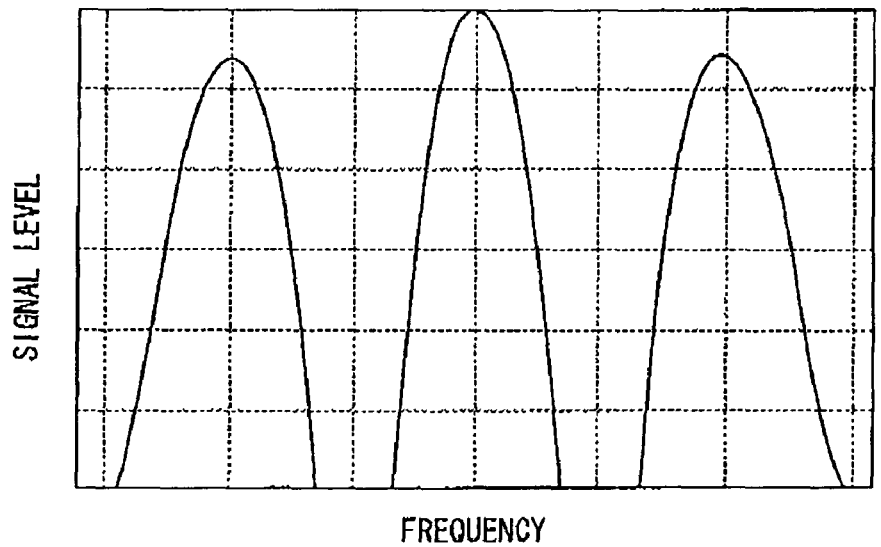
FIG. 6 is a diagram illustrating variation of signal level over frequency to illustrate Brillouin spectrum of an interference signal.

The apparatus S1 takes the sum of the electric signal 11a and the delayed electric signal that has been generated by delaying the electric signal 11a by a delay time that corresponds to the time interval between the first and second optical pulses 3a1 and 3a2. The apparatus S1 takes the sum of the first and second optical pulse related components, while adjusting the time axes, thereby generating the interference signal 11a3. The phase difference between the first and second Brillouin backscattered light of the first and second optical pulse related components corresponds to the time interval between the first and second optical pulses 3a1 and 3a2. FIG. 6 is a diagram illustrating variation of signal level over frequency to illustrate Brillouin spectrum of the interference signal 11a3. The Brillouin spectrum of the interference signal 11a3 is narrowed and steeped as shown in FIG. 6. The signal processing unit 14 measures the characteristics of the optical fiber 7 using the interference signal 11a3 that has the narrowed and steeped Brillouin spectrum as shown in FIG. 6. Use of the interference signal 11a3 having the narrowed and steeped Brillouin spectrum allows the highly accurate measurement of Brillouin frequency shift, thereby improving the spatial resolution.

The apparatus S1 for measuring the characteristics of an optical fiber is so configured as described above. A series of first and second optical pulses 3a1 and 3a2 are generated from the coherent light 1a, wherein the time interval between the first and second optical pulses 3a1 and 3a2 is equal to or shorter than the life time of the acoustic wave in the optical fiber 7. An optical signal that includes the first and second Brillouin backscattered lights of the first and second optical pulses 3a1 and 3a2 is optically combined with the coherent light, thereby generating the optical signal 81a. The optical signal 81a is then converted into an electrical signal 82a. There is taken a sum of first and second electric components which respectively belong to the reflected lights of the first and second optical pulses 3a1 and 3a2, while adjusting respective time axes of the first and second electric components with each other, thereby generating an interference signal 11a3. The interference signal 11a3 represents a Brillouin spectrum that is pinched and narrower than the Brillouin spectrum based on the first optical pulse related component and the Brillouin spectrum based on the second optical pulse related component. Evaluation of the characteristics of the optical fiber 7 based on the interference signal 11a3 makes it easy to detect the Brillouin frequency shift, thereby improving the spatial resolution efficiently.

The apparatus S1 for measuring the characteristics of an optical fiber renders an optical signal launched into one end of the optical fiber for using the Brillouin scattering phenomenon in measuring the characteristics of an optical fiber, thereby improving the spatial resolution.

Figure 7:
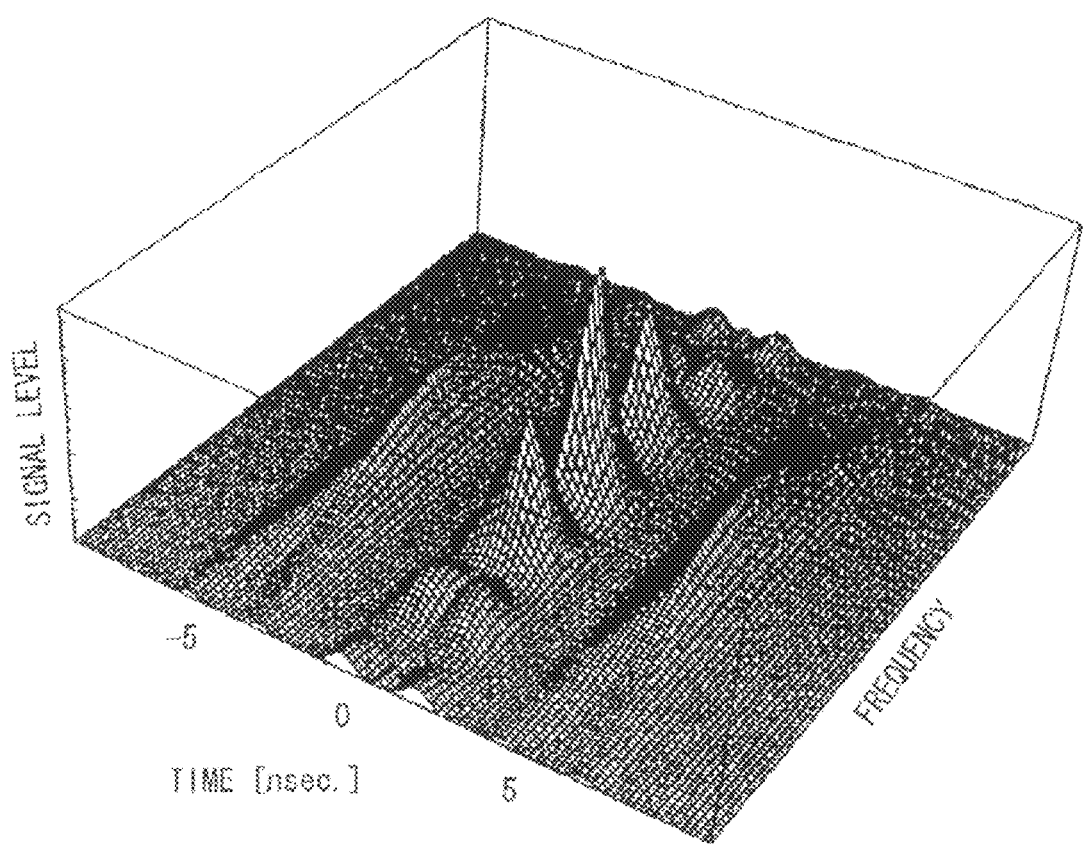
FIG. 7 is a graph illustrating variation of signal level over frequency and time to illustrate a simulation result by the apparatus of FIG. 1.

FIG. 7 is a graph illustrating variation of signal level over frequency and time to illustrate a simulation result by the apparatus S1 of FIG. 1. FIG. 7 illustrates the simulation result of the measured signal of the Brillouin backscattered light that has been transmitted backwardly from one point of the optical fiber 7 under the conditions that the time interval between the first and second optical pulses 3a1 and 3a2 is 5 nanoseconds and the pulse width of the first and second optical pulses 3a1 and 3a2 is 2 nanoseconds. The pulse width is smaller than a half of the time interval between the first and second optical pulses 3a1 and 3a2. A signal appearing at −5 nanoseconds represents the Brillouin spectrum that belongs to the first optical pulse related component. Another signal appearing at 5 nanoseconds represents the Brillouin spectrum that belongs to the second optical pulse related component. Another signal appearing at 0 nanosecond represents the Brillouin spectrum that that belongs to the interference signal 11a3 which has been generated by taking the sum of the first and second optical pulse related components, while adjusting time axes thereof.

This result of simulation demonstrates that taking the sum of the first and second optical pulse related components having broad Brillouin spectrums while adjusting time axes thereof generates the interference signal 11a3 that has the narrowed and steeped Brillouin spectrum.

Figure 8:
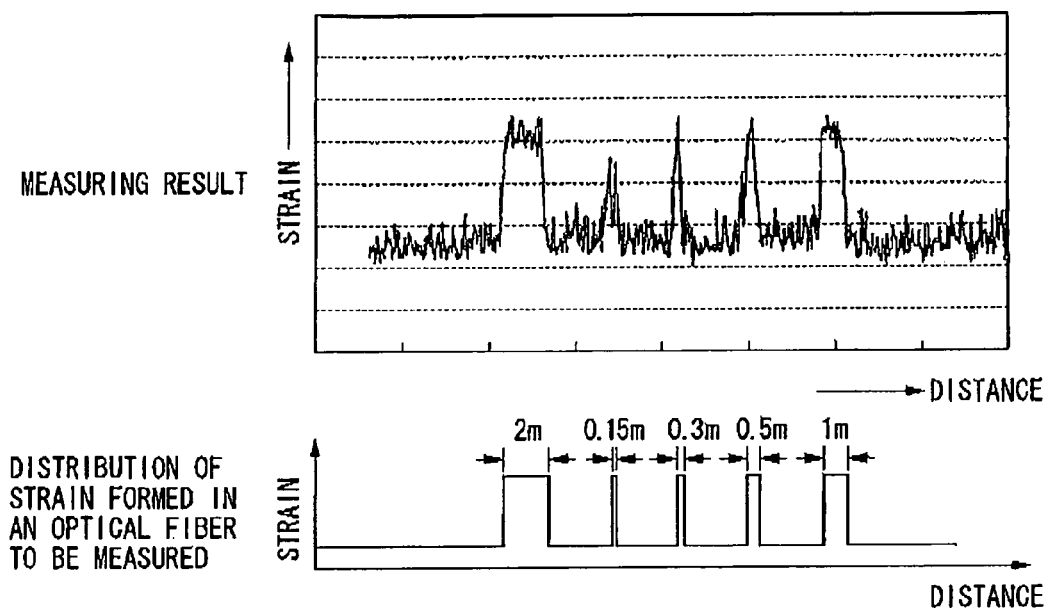
FIG. 8 is a graph illustrating measured strain over distance where strain is intentionally introduced into the optical fiber 7 to be measured by the apparatus of FIG. 1.
Figure 9:
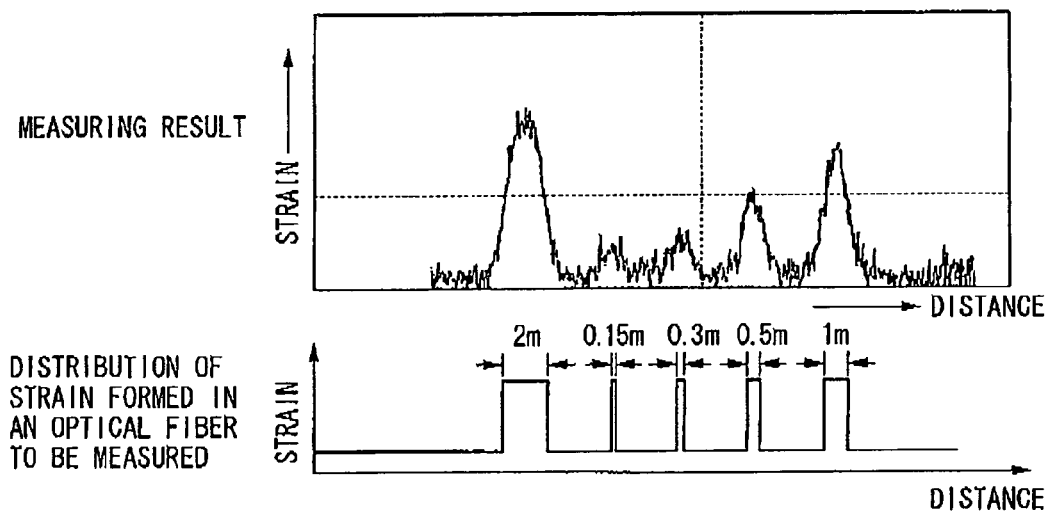
FIG. 9 is a graph illustrating measured strain over distance where strain is intentionally introduced into the optical fiber 7 to be measured by a conventional apparatus that uses a single optical pulse.

FIG. 8 is a graph illustrating measured strain over distance where strain is intentionally introduced into the optical fiber 7 to be measured by the apparatus S1 of FIG. 1. FIG. 9 is a graph illustrating measured strain over distance where strain is intentionally introduced into the optical fiber 7 to be measured by a conventional apparatus that uses a single optical pulse.

The result of measurement of the strain shown in FIG. 8 by the apparatus S1 of FIG. 1 is closer to the distribution of the strain that has been introduced into the optical fiber 7 as compared to the result of measurement of the strain shown in FIG. 9 by the conventional apparatus. These results demonstrate that the apparatus S1 of FIG. 1 improves the spatial resolution efficiently.

The measurement result of FIG. 8 was obtained by processing raw data by the signal processor 14. It is also possible to perform filtering process to the raw data, thereby realizing higher accurate strain-distribution measurement. Typical examples of available filtering process may include, but are not limited to, noise-reduction filter to Brillouin spectrum, curve-fitting as approximation, a filtering-process adjusted to cyclic variation of Brillouin spectrum.

Second Embodiment

A second embodiment of the present invention will be described. The second embodiment provides an apparatus S2 for measuring the characteristics of an optical fiber. The apparatus S2 is different from the apparatus S1 described above. The following descriptions will focus on the difference of the apparatus S2 from the apparatus S1 to avoid duplicate descriptions thereof.

Figure 10:
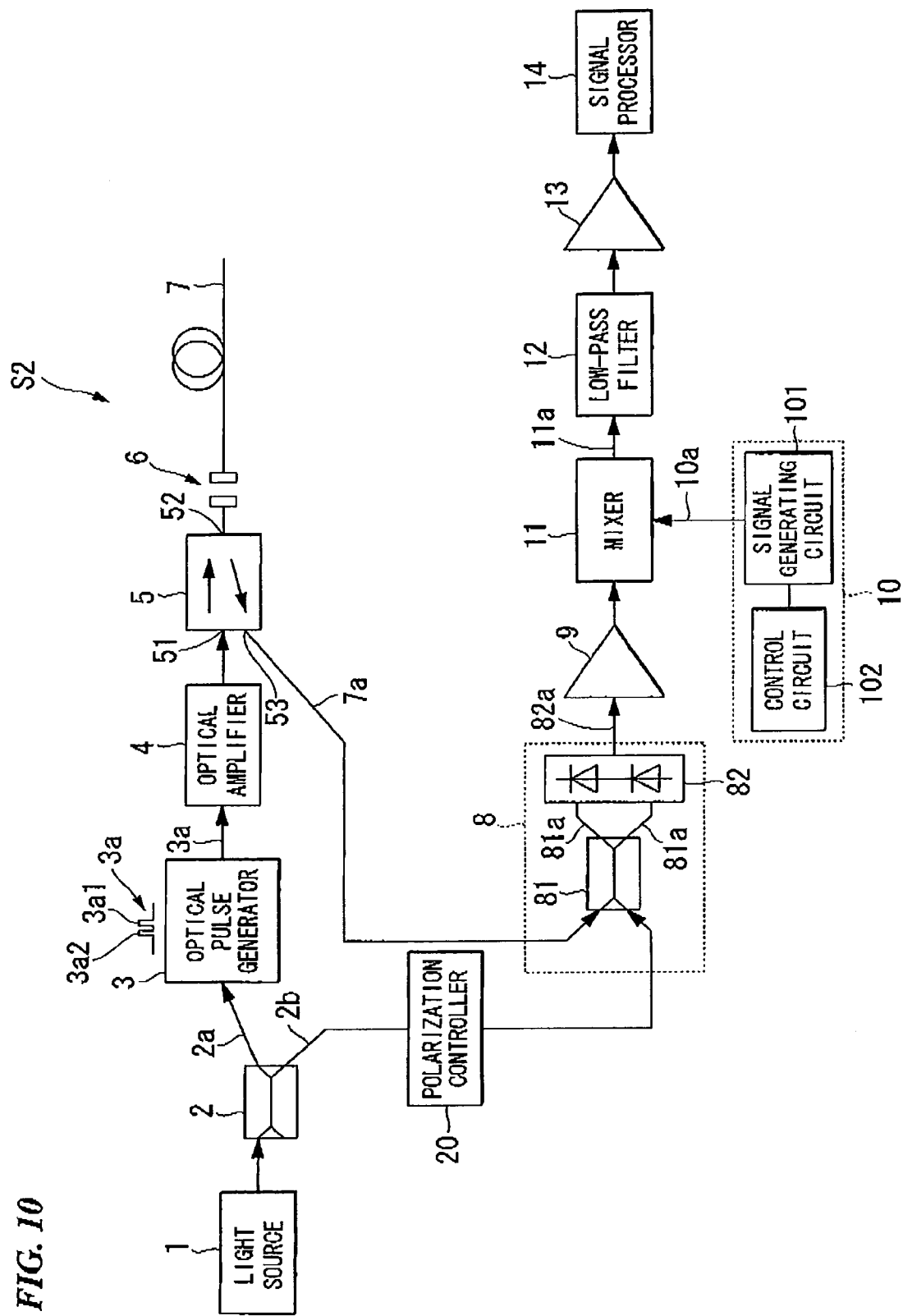
FIG. 10 is a block diagram illustrating a configuration of an apparatus for measuring the characteristics of an optical fiber in accordance with a second embodiment of the present invention.
Figure 11:
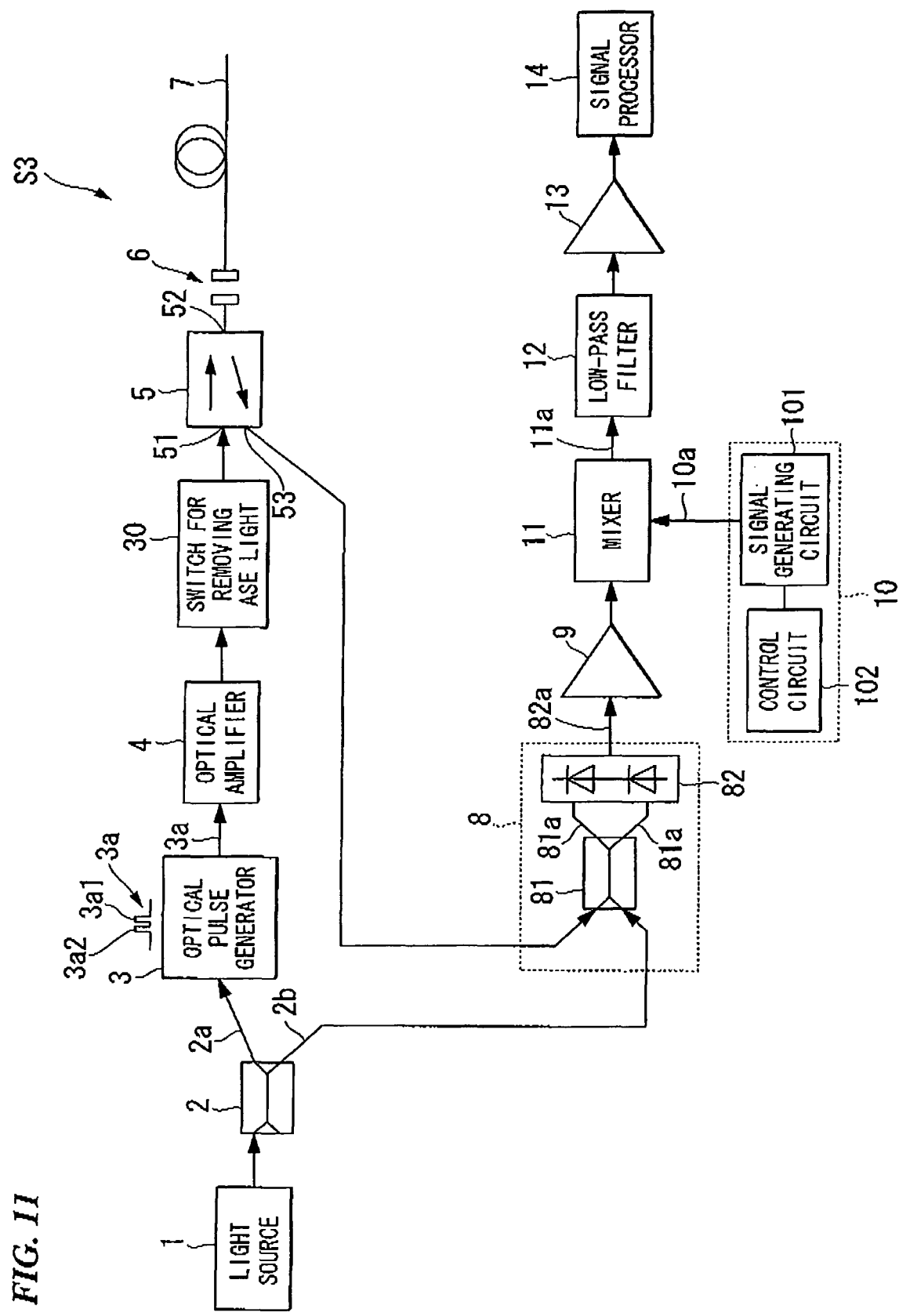
FIG. 11 is a block diagram illustrating a configuration of an apparatus for measuring the characteristics of an optical fiber in accordance with a third embodiment of the present invention.

FIG. 10 is a block diagram illustrating a configuration of an apparatus for measuring the characteristics of an optical fiber in accordance with the second embodiment of the present invention. The apparatus S2 for measuring the characteristics of an optical fiber may include a light source 1, a branch coupler 2, an optical pulse generator 3, an optical amplifier 4, an optical directional coupler 5, an optical connector 6, an optical fiber 7, a balanced light receiving circuit 8, a first amplifier 9, a signal generator 10, a mixer 11, a low-pass filter 12, a second amplifier 13, a signal processing unit 14, and a polarization controller 20.

The polarization controller 20 is disposed between the branch coupler 2 and the balanced light receiving circuit 8. The polarization controller 20 is configured to vary the polarization state of a coherent light 2b at high speed, thereby causing a random change.

In accordance with the above-described first embodiment, it has been assumed that there is a constant relationship of polarization between the reflected light 7a and the coherent light 2b that is incident into the branch coupler 81 in the balanced light receiving circuit 8. It is known that there is a constant relationship of polarization between the reflected light 1a and the coherent light 2b only when the optical fiber 7 is a polarization-maintaining optical fiber or a multimode optical fiber that has random polarization state. If the optical fiber 7 is the general optical fiber, the relationship of polarization between the reflected light 7a and the coherent light 2b is not constant.

The detection sensitivity of the balanced light receiving circuit 8 depends on polarization so that the maximum value is taken when the polarization axis of the coherent light 2b is identical to the polarization axis of the reflected light 7a, while the detection sensitivity 0 is taken when the polarization axis of the coherent light 2b is perpendicular to the polarization axis of the reflected light 7a.

In accordance with the apparatus S2 for measuring the characteristics of an optical fiber, the polarization controller 20 is configured to cause high speed variation of the polarization state of the coherent light 2b, thereby causing random change, so as to average the detection sensitivity of the balanced light receiving circuit 8. As a result, the polarization dependency of the balanced light receiving circuit 8 can be canceled.

It is also possible that the polarization controller 20 is configured to vary, by 90 degrees per predetermined unit time, the polarization state of the coherent light 2b so as to calculate the averaged sum of squares of two measurement results at different times, thereby cancelling the polarization dependency of the balanced light receiving circuit 8.

In this embodiment, the polarization controller 20 is disposed between the branch coupler 2 and the balanced light receiving circuit 8. It is possible as a modification that the polarization controller 20 is disposed between the branch coupler 2 and the optical directional coupler 5, so that the polarization controller 20 varies the polarization of a series of pluses 3a thereby cancelling the polarization dependency of the balanced light receiving circuit 8. It is also possible as a further modification that the polarization controller 20 is disposed between the optical directional coupler 5 and the optical fiber 7, so that the polarization controller 20 varies the polarization of the reflected light 7a thereby cancelling the polarization dependency of the balanced light receiving circuit 8.

Third Embodiment

A third embodiment of the present invention will be described. The third embodiment provides an apparatus S3 for measuring the characteristics of an optical fiber. The apparatus S3 is different from the apparatus S1 described above. The following descriptions will focus on the difference of the apparatus S3 from the apparatus S1 to avoid duplicate descriptions thereof. The apparatus S3 for measuring the characteristics of an optical fiber may include a light source 1, a branch coupler 2, an optical pulse generator 3, an optical amplifier 4, an optical directional coupler 5, an optical connector 6, an optical fiber 7, a balanced light receiving circuit 8, a first amplifier 9, a signal generator 10, a mixer 11, a low-pass filter 12, a second amplifier 13, a signal processing unit 14, and an ASE-light removing optical switch 30.

The ASE-light removing optical switch 30 is disposed between the optical amplifier 4 and the optical directional couplet 5. The ASE-light removing optical switch 30 is configured to remove ASE-light as noise component from the series of optical pulses 3a that has been generated by the optical amplifier 4.

In the above-described first embodiment, the noise components generated by the optical amplifier 4 are not removed, and the noise components may deteriorate the reflected light 7a. Thus, it is desired to remove the noise component from the series of optical pulses 3a that has been generated by the optical amplifier 4. In this embodiment, however, the ASE-light removing optical switch 30 is disposed between the optical amplifier 4 and the optical directional coupler 5 so as to remove ASE-light as noise component from the series of optical pulses 3a that has been generated by the optical amplifier 4. The ASE-light removing optical switch 30 prevent deterioration of the signal-to-noise (S/N) ratio of the reflected light 7a. Namely, the ASE-light removing optical switch 30 performs as a remover that removes unnecessary component from the series of first and second optical pulses that are to be transmitted to the optical fiber 7. The unnecessary component is ASE-light.

In the same point of view to remove the noise component that is carried on the series of optical pulses 3, it is also possible to dispose a remover on the stage subsequent to the optical pulse generator 3, wherein the remover removes leakage of light in OFF-time of the optical pulse generator 3.

The term "configured" is used to describe a component, section or part of a device includes hardware and/or software that is constructed and/or programmed to carry out the desired function.

The terms of degree such as "substantially" "about," and "approximately" as used herein mean a reasonable amount of deviation of the modified term such that the end result is not significantly changed. For example, these terms can be construed as including a deviation of at least ±5 percents of the modified term if this deviation would not negate the meaning of the word it modifies.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An apparatus for measuring the characteristics of an optical fiber, the apparatus comprising:
    an optical pulse generator that generates a series of first and second optical pulses from a coherent light, the first and second optical pulses having a time interval between them, the time interval being equal to or shorter than a life time of an acoustic wave in the optical fiber, the optical pulse generator emitting the series of first and second optical pulses toward the optical fiber;
    a detector that couples the coherent light with a Brillouin backscattered light which includes first and second Brillouin backscattered lights belonging to the first and second optical pulses respectively, thereby generating an optical signal, the detector converting the optical signal into an electrical signal;
    a signal processor that takes the sum of the electrical signal and a delay electrical signal which is delayed from the electrical signal by a delay time corresponding to the time interval, thereby generating an interference signal, the signal processor finding the characteristics of the optical fiber based on the interference signal; and
    a frequency-varying device that allows the signal processor to obtain a Brillouin spectrum from the electrical signal.

2. The apparatus according to claim 1, further comprising:
    a polarization state varying device that varies at least one of a polarization state of the coherent light and a polarization state of the Brillouin backscattered light.

3. The apparatus according to claim 1, further comprising:
    a remover that removes unnecessary component from the series of the first and second optical pulses that are to be transmitted to the optical fiber.

4. The apparatus according to claim 1, further comprising:
    a signal generator that generates a mixing signal having a frequency that generally corresponds to Brillouin frequency shift of the optical fiber.

5. The apparatus according to claim 1, wherein the life time is a time period from appearance of the power peak of the acoustic wave until the power of the acoustic wave is decayed to not more than 5% of the peak power.

* * * * *

UNITED STATES PATENT AND TRADEMARK OFFICE
CERTIFICATE OF CORRECTION

| | |
|---|---|
| PATENT NO. | : 7,873,273 B2 |
| APPLICATION NO. | : 12/000249 |
| DATED | : January 18, 2011 |
| INVENTOR(S) | : Yahei Koyamada |

It is certified that error appears in the above-identified patent and that said Letters Patent is hereby corrected as shown below:

Title page, Item (75) Inventor, please delete "3-12-13 Minami-Koiwa, Endogawa-ku,".

Signed and Sealed this
Thirty-first Day of May, 2011

David J. Kappos
*Director of the United States Patent and Trademark Office*